United States Patent
Neal et al.

(10) Patent No.: US 6,187,138 B1
(45) Date of Patent: *Feb. 13, 2001

(54) METHOD FOR CREPING PAPER

(75) Inventors: Charles William Neal; Lois Jean Forde-Kohler, both of Cincinnati; Donald Arthur Salsman, West Chester, all of OH (US)

(73) Assignee: The Procter & Gamble Company, Cincinnati, OH (US)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/042,936

(22) Filed: Mar. 17, 1998

(51) Int. Cl.[7] .............................. B31F 1/12; D21H 11/00

(52) U.S. Cl. .............................................. 162/111; 162/112

(58) Field of Search ................................... 162/111, 112

(56) References Cited

U.S. PATENT DOCUMENTS

| | | | |
|---|---|---|---|
| 3,926,716 | 12/1975 | Bates | 162/113 |
| 4,063,995 | 12/1977 | Grossman | 162/112 |
| 4,064,213 | 12/1977 | Lazorisak et al. | 264/134 |
| 4,304,625 | 12/1981 | Grube et al. | 162/111 |
| 4,308,092 | 12/1981 | Latimer et al. | 162/111 |
| 4,406,737 | 9/1983 | Latimer et al. | 162/111 |
| 4,436,867 | 3/1984 | Pomplun et al. | 524/503 |
| 4,448,638 | 5/1984 | Klowak | 162/112 |
| 4,482,429 | 11/1984 | Klowak | 162/111 |
| 4,501,640 | 2/1985 | Soerens | 162/111 |
| 4,528,316 | 7/1985 | Soerens | 524/503 |
| 4,684,439 | 8/1987 | Soerens | 162/111 |
| 4,788,243 | 11/1988 | Soerens | 524/503 |
| 4,883,564 | 11/1989 | Chen et al. | 162/112 |
| 4,886,579 | 12/1989 | Clark et al. | 162/111 |
| 4,992,140 | 2/1991 | Anderson et al. | 162/111 |
| 4,994,146 | 2/1991 | Soerens | 162/112 |
| 5,025,046 | 6/1991 | Soerens | 524/72 |
| 5,179,150 | 1/1993 | Furman, Jr. et al. | 524/376 |
| 5,187,219 | 2/1993 | Furman, Jr. | 524/377 |
| 5,234,547 | 8/1993 | Knight et al. | 162/111 |

(List continued on next page.)

FOREIGN PATENT DOCUMENTS

| | | | |
|---|---|---|---|
| 0 743 172 A1 | 11/1996 | (EP) | B31F/1/12 |
| 0802215 | 10/1997 | (EP) | C08G/73/02 |
| 0814108 | 12/1997 | (EP) | C08G/73/02 |
| 2 179 953 | 3/1987 | (GB) | C09J/3/00 |
| WO 97/11223 | 3/1997 | (WO) | D21F/11/00 |
| WO 97/44526 | 11/1997 | (WO) | D21H/21/14 |

OTHER PUBLICATIONS

Oliver, John F., *Tappi Journal*, Dry-Creping of Tissue Paper—A Review of Basic Factors, Dec. 1980, vol. 63, No. 12, pp. 91–95.

Gary S. Furman and Winston Su, "A Review of Chemical and Physical Factors Influencing Yankee Dryer Coatings" *Nordic Pulp and Paper Research Journal*, no/ 1/1993.

*Primary Examiner*—Christopher A. Fiorilla
(74) *Attorney, Agent, or Firm*—Julia A. Glazer; Tara M. Rosnell (57) ABSTRACT

A method for producing creped paper products comprising applying to a drying surface, a film-forming semi-crystalline polymer and a non-thermosetting cationic resin wherein the resin is characterized by a highly branched structure that lacks reactive intralinker functionality and which has a prepolymer backbone comprised of intralinked polyamidoamine. The invention also comprises a method for producing creped paper products comprising applying to a drying surface a film-forming semi-crystalline polymer, a non-thermosetting cationic resin wherein the resin is characterized by a highly branched structure that lacks reactive intralinker functionality and which has a prepolymer backbone comprised of intralinked polyamidoamine, and an optional plasticizer.

11 Claims, 2 Drawing Sheets

U.S. PATENT DOCUMENTS

| | | | |
|---|---|---|---|
| 5,246,544 | 9/1993 | Hollenberg et al. | 162/111 |
| 5,326,434 | 7/1994 | Carevic et al. | 162/111 |
| 5,338,807 | 8/1994 | Espy et al. | 525/430 |
| 5,370,773 | 12/1994 | Luu et al. | 162/111 |
| 5,374,334 | 12/1994 | Sommese et al. | 162/111 |
| 5,382,323 | 1/1995 | Furman, Jr. et al. | 162/111 |
| 5,468,796 | 11/1995 | Chen et al. | 524/377 |
| 5,490,903 | 2/1996 | Chen et al. | 162/111 |
| 5,492,599 | 2/1996 | Olson et al. | 162/137 |
| 5,494,554 | 2/1996 | Edwards et al. | 162/111 |
| 5,591,306 * | 1/1997 | Kaun | 162/127 |
| 5,633,309 | 5/1997 | Warchol et al. | 524/538 |
| 5,660,687 | 8/1997 | Allen et al. | 162/111 |
| 5,786,429 | 7/1998 | Allen | 525/430 |
| 5,833,806 | 11/1998 | Allen | 162/111 |

* cited by examiner

METHOD FOR CREPING PAPER

FIELD OF THE INVENTION

This invention relates to a new creping aid composition and a method for producing creped paper products using this composition which results in improved paper quality and a more efficient method for manufacturing creped paper products.

BACKGROUND OF THE INVENTION

Enhancing the softness of paper products such as tissue and towelling is desirable. Softness is the tactile sensation a user perceives as the user holds, rubs or crumples a particular paper product. This tactile sensation is provided by a combination of several physical properties including the bulk, stiffness and stretchability of the paper.

Creping, a process which is well known in the art, is a means of mechanically foreshortening a fibrous structure in the machine direction in order to enhance the softness, bulk and stretchability of the paper. Creping is generally accomplished with a flexible blade, known as a creping blade, which is placed against a drying surface such as a Yankee dryer. The fibrous structure adheres to the Yankee dryer as it contacts the dryer surface. The fibrous structure travels along the surface of the Yankee dryer until it is removed by the creping blade. The degree to which the fibrous structure adheres to the Yankee dryer prior to creping is a key factor in determining the degree of softness, bulk, and stretchability exhibited by the fibrous structure after creping.

Creping aids are generally applied to the surface of the Yankee dryer to further facilitate the adhesion/creping process. It is desirable to deposit the creping aid on the surface of the Yankee dryer. The level of adhesion of the fibrous structure to the Yankee surface is of importance as it relates to the control of the fibrous structure in its travel from the creping blade to the reel of the paper machine. Fibrous structures which are insufficiently adhered to the surface of the Yankee dryer are generally difficult to control and often result in quality problems at the reel such as wrinkling, foldovers and weaved edges. Poorly creped paper affects the reliability of the entire papermaking process and subsequent converting operation.

The level of adhesion of the fibrous structure to the Yankee surface is also of importance as it relates to the drying of the fibrous structure. Higher levels of adhesion permit better heat transfer. This enables the fibrous structure to dry faster thus allowing the operation to run at higher speeds.

It has been observed on paper machines utilizing through-air drying, that less creping aid tends to deposit on the dryer surface compared to paper machines utilizing conventional press sections. A through-air dried fibrous structure tends to be transferred to the Yankee dryer at a higher consistency than a fibrous structure which is conventionally wet pressed. Additionally, due to limited knuckle area, a fibrous structure which is through-air dried, will have a smaller area of contact with the nip of the Yankee dryer pressure roll than a fibrous structure which is conventionally wet pressed. Thus, through-air dried fibrous structures or other papermaking processes which yield structured paper tend to have poorer adhesion than fibrous structures which are conventionally wet pressed.

Prior to the development of creping aids, adhesion of the fibrous structure to the dryer surface was accomplished through the presence of naturally occurring hemicellulose present in the paper fiber. Hemicellulose deposits were observed forming on the surface of the dryer as a result of the evaporation of water from the fibrous structure. The hemicellulose deposits were found to contain small fiber fragments picked out of the fibrous structure. It was noted that these deposits resulted in the formation of a heavy film on the surface of the Yankee dryer and subsequent poor crepe quality. For those paper machines utilizing through-air drying, it was further observed that the formation of hemicellulose deposits on the surface of the Yankee dryer was greatly reduced and hence not sufficient to provide an adequate coating. As a result, creping aids were developed in order to supplement the coating formation.

The first creping aids utilized with through-air drying were animal hide glues. These glues, made from gelatin, have a complex, irregular molecular structure and dry to an irregular, disordered mass. Given their irregular molecular structure, these type of glues tend to form a coating on the surface of the Yankee dryer which exhibits low mechanical strength thus making the coating relatively easy to remove from the Yankee dryer surface. However, a major limitation of these glues is that they require large amounts of water in the fiber in order for the glues to achieve the necessary tack required at the pressure roll/Yankee nip. Thus for those paper machines which run at higher speed and lower consistencies, the effectiveness of these types of glues tends to be limited.

It is important that the creping aid allow for a proper balance between adhesion of the fibrous structure to the drying surface and the release of the fibrous structure at the creping blade. Historically, one of the difficulties encountered with the use of creping aids has been a tendency for the creping aid to form a bond between the fibrous structure and the drying surface at the point of creping such that the fibrous structure does not properly release from the drying surface. This results in portions of the fibrous structure remaining adhered to the surface thus causing defects in the fibrous structure and/or causing the fibrous structure to break.

Another common problem associated with the use of creping aids, is an excessive build-up of the creping aid on the drying surface. While some amount of buildup of the creping aid on the surface is essential, excessive buildup can produce streaks which impact the profile of adhesion across the width of the drying surface. This can result in bumps or wrinkles in the finished paper. Quite often, a second blade, known as a cleaning blade, is placed on the drying surface just after the creping blade. The purpose of the cleaning blade is to remove excess creping aid and other residue left behind. Historically, both the creping blade and cleaning blade have had to be frequently changed in order to prevent excessive buildup.

In order to prevent excessive buildup on the drying surface, it is important that the creping aid be rewettable. "Rewettable", as used herein, refers to the ability of the creping aid remaining on the Yankee dryer surface to be activated by the moisture contained in the fibrous structure. A marked increase in tack is indicative of high rewettability. Because through-air drying tends to remove more water than a conventional wet press section, a fibrous structure which is through-air dried will typically be transferred to the Yankee dryer at a higher consistency than a fibrous structure which is conventionally wet pressed.

Because a through-air dried fibrous structure contains less moisture than a similar fibrous structure which is conventionally wet pressed, there is less moisture available in the through-air dried fibrous structure to be transferred to the surface of the Yankee dryer. A fibrous structure which has been dried to a relatively higher fiber consistency, such as a through-air dried fibrous structure, is more difficult to adhere to the drying surface because the fibrous structure has less water available to rewet the creping aid at the point at which the fibrous structure is transferred to the drying surface.

With the advent of new through-air technology, such as that taught in commonly assigned U.S. Pat. Nos. 5,274,930, issued to Ensign et al. on Jan. 4, 1994 and U.S. Pat. No. 5,584,126, issued to Ensign et al. on Dec. 17, 1996 both of which are incorporated herein by reference, the distribution of moisture in the fibrous structure is more uniform throughout the fibrous structure for a given consistency. This results in less moisture in the knuckle area as measured after the fibrous structure leaves the through-air dryers. Knuckles which are dryer require that the coating formed by the application of the creping aid to the Yankee dryer provide good adhesion of the fibrous structure to the Yankee dryer as the fibrous structure contacts the Yankee dryer at the pressure roll.

U.S. Pat. No. 3,926,716, issued to Bates on Dec. 16, 1975 and incorporated herein by reference, teaches a polyvinyl alcohol creping adhesive which forms a film upon application to the surface of the Yankee dryer. It is believed that the polyvinyl alcohol exhibits a rewet mechanism wherein the film already on the surface of the Yankee dryer is rewetted as moisture is released from the fibrous structure at the pressure roll nip of the Yankee dryer.

Polyvinyl alcohol creping adhesives require less moisture than animal glue to provide tack to the surface of the Yankee dryer. However, since polyvinyl alcohol films are high molecular weight films having a highly crystalline structure, when used alone as creping adhesives, they tend to adhere strongly to the Yankee dryer surface resulting in excessive coating buildup and streaks.

Mixtures of polyvinyl alcohol and animal glue provide good tack and acceptable doctorability. However, it has been found that given the typically varying conditions of the paper mill water chemistry, the paper machine fiber and additive chemistry, and variations between different paper machines, it is desirable to blend polyvinyl alcohol with a variety of synthetic polymers. A common drawback observed with existing coating formulations is the occurrence of coating upsets (i.e.; any type of change that occurs to the coating which negatively impacts the coating characteristics) that result in poor reliability (eg. increased sheet breaks, flying and weaving, frequent blade changes, etc.).

With the advent of the addition of wet strength resins to the wet end of the paper machine based on polyamide polyamine epichlorohydrin (PAA) wherein the amine is a secondary amine, it was observed that adhesion of the fibrous structure to the Yankee dryer surface improved. This led to the development of creping aids based on similar PAA secondary amine resin chemistry as that used for wet strength resins. PAA secondary amine based creping aids have had wide acceptance in those paper machine systems using a conventional wet press section. However, in those paper machine systems utilizing through-air drying, creping aids based on PAA secondary amine chemistry have not enjoyed the same success.

This stems from the fact that creping aids based on PAA secondary amine resin chemistry are thermosetting and thus will cure on the heated surface of the Yankee dryer. Creping aids containing thermosetting resins are problematic in that the coating formed by the application of the creping aid to the Yankee dryer on a machine utilizing through-air drying tends to be brittle and exhibits poor adhesion to the dryer surface.

Another problem stems from those processes that utilize the wet end addition of wet strength resins which are thermosetting. The thermosetting wet strength resins will actively crosslink with creping aids which contain a secondary amine backbone. This results in the formation of a hard coating on the surface of the Yankee dryer having poor adhesive properties which in turn leads to an overall reduction in the efficacy of the creping aid.

U.S. Pat. No. 4,501,640, issued to Soerens on Feb. 26, 1985, purports to teach a method for creping a cellulosic fibrous structure wherein an admixture of polyvinyl alcohol and a water-soluble thermosetting cationic polyamide resin are applied to a creping cylinder.

U.S. Pat. No. 5,187,219, issued to Furman, Jr. on Feb. 16, 1993 purports to teach a creping adhesive composition comprising a thermosetting water soluble acrylamide polymer having glyoxal-reacted amide substituents and unsubstituted amide groups and a method of applying the composition.

U.S. Pat. No. 5,494,554, issued to Edwards et al. on Feb. 27, 1996, purports to teach the application of a creping adhesive comprising a thermosetting cationic polyamide resin and a plasticizer to the surface of a dryer.

All of these teachings suffer from a common drawback in that each of the purported creping aids contains a thermosetting resin. The thermosetting resin will cure on the heated surface of the Yankee dryer forming a brittle coating with poor adhesion characteristics. Additionally, each of the purported creping aids contains secondary amines. The use of creping aids containing secondary amines in conjunction with the addition of a thermosetting wet strength resin will tend to reduce the efficacy of the creping aid as the creping aid will crosslink with the active secondary amine groups present in the thermosetting wet strength resin. This results in a loss of adhesion of the creping aid.

The present invention provides a method of producing a creped paper product exhibiting overall improved crepe quality.

The present invention also provides a creping aid which exhibits overall improved performance in conjunction with all types of fibrous structures including those through-air dried fibrous structures transferred to the Yankee dryer at higher consistencies such as those fibrous structures taught in commonly assigned U.S. Pat. No. 3,301,746, issued to Sanford et al. on Jan. 31, 1967; U.S. Pat. No. 5,274,930 issued to Ensign et al. on Jan. 4, 1994; and U.S. Pat. No. 5,584,126, issued to Ensign et al. on Dec. 17, 1996 all of which are incorporated herein by reference.

This invention further provides a more efficient method for producing creped paper products wherein the creping aid is not deleteriously impacted by the use of thermosetting wet strength resins.

Benefits of the present invention include the ability to control coating buildup on the surface of the Yankee dryer as a function of changing paper machine system conditions and the ability to control individual properties of the coating such as the adhesive, release, and rewettability properties thereby providing enhanced machine runnability and improved paper quality.

SUMMARY OF THE INVENTION

This invention comprises a creping aid composition and a method for making creped paper products using the creping aid composition of this invention. The method comprises five basic steps including:

a) providing a fibrous structure;
b) providing a drying surface;
c) applying a creping aid comprising a film-forming semi-crystalline polymer and a non-thermosetting cationic resin wherein the non-thermosetting cationic resin is characterized by a highly branched structure that lacks reactive intralinker functionality and which has a prepolymer backbone comprised of intralinked polyamidoamine;
d) applying a fibrous structure to the drying surface whereby the fibrous structure contacts the creping aid; and
e) removing the fibrous structure from the drying surface.

The creping aid may be applied directly to the drying surface or it may be applied directly to that surface of the fibrous structure which contacts the drying surface. The creping aid may also be applied directly to the forming fabric or the foraminous carrier fabric. The drying surface may be heated. Upon contact with the drying surface, the fibrous structure has a moisture content of between about 10% to 90%. The fibrous structure can be removed from the drying surface by creping. The creping aid is applied at a rate of from about 0.25 to 8.5 pounds of dry weight of the total applied creping aid per ton of dry fiber produced at the reel of the paper machine.

The invention also comprises a creping aid composition comprising a film-forming semi-crystalline polymer and a non-thermosetting cationic resin. The non-thermosetting cationic resin may be formulated with secondary or tertiary amines in the prepolymer backbone. The secondary or tertiary amines in the prepolymer backbone are comprised of intralinked polyamidoamine characterized by a highly branched structure that lacks the reactive intralinker functionality of the wet strength resins and creping adhesive resins in the prior art. The prophetically preferred polyalkylene polyamine of this invention has at least two primary amine groups, at least one tertiary amine group(s) and no secondary amine groups. A prophetically preferred polyalkylene polyamine is N-methyl-bis-(aminopropyl)amine (MBAPA). For papermaking applications which do not use thermosetting wet strength resins or for those papermaking applications which utilize only temporary wet strength technology, the prepolymer can be chosen from any of the suggested prepolymer options.

The creping aid composition may also optionally comprise a plasticizer. The non-thermosetting cationic resin and plasticizer can be applied together while the polyvinyl alcohol is applied separately or alternatively, the resin, plasticizer and polyvinyl alcohol can each be applied separately.

The film-forming semi-crystalline polymer of this invention is selected from the group consisting of hemicellulose, carboxymethyl cellulose and polyvinyl alcohol. If polyvinyl alcohol is selected, it is preferred that it have a degree of hydrolysis of at least about 86%.

The plasticizer may be selected from the group consisting of ethylene glycol, diethylene glycol, triethylene glycol, dipropylene glycol and glycerol. The plasticizer may comprise from about 0.5% to 90% of the creping aid based on the dry weight of the plasticizer relative to the dry weight of the creping aid.

DETAILED DESCRIPTION OF THE INVENTION

The present invention relates to a creping aid composition and a method for making creped paper products using the creping composition of this invention. There are five basic steps in this method including but not limited to:

a) providing a fibrous structure;
b) providing a drying surface;
c) applying a creping aid comprising a film-forming semi-crystalline polymer and a non-thermosetting cationic resin. The non-thermosetting cationic resin is comprised of intralinked polyamidoamine, preferably characterized by a highly branched structure that lacks the reactive intralinker functionality of the wet strength and creping adhesive resins in the prior art. For paper making processes utilizing thermosetting wet strength resins, use of a polyalkylene polyamine having no secondary amine groups, at least two primary amine groups and at least one tertiary amine group is prophetically preferred. An example of a prophetically preferred polyalkylene polyamine is N-methyl-bis-(aminopropyl)amine (MBAPA).
d) applying a fibrous structure to the drying surface whereby the fibrous structure contacts the creping aid;
e) removing the fibrous structure from the drying surface.

Providing a Fibrous Structure
Components of the Aqueous Papermaking Furnish Comprising the Fibrous Structure As used herein, "fibrous structure" refers to a fibrous material which may be comprised of cellulosic and noncellulosic components. These cellulosic and noncellulosic components which include papermaking fibers and other various additives are mixed with water to form an aqueous slurry. It is this aqueous slurry which constitutes the aqueous papermaking furnish. It is anticipated that wood pulp in all its varieties will normally comprise the papermaking fibers used in this invention. However, other cellulose fibrous pulps, such as cotton linters, bagasse, rayon and other synthetic fibers, etc., can be used and none are disclaimed. Wood pulps useful herein include chemical pulps such as, sulfite and sulfate (sometimes called kraft) pulps as well as mechanical pulps including for example, groundwood, thermomechanical pulp (TMP) and chemithermomechanical pulp (CTMP).

Both hardwood pulps and softwood pulps as well as combinations of the two may be employed as papermaking fibers for the present invention. The term "hardwood pulps" as used herein refers to fibrous pulp derived from the woody substance of deciduous trees (angiosperms), whereas "softwood pulps" are fibrous pulps derived from the woody substance of coniferous trees (gymnosperms). Pulps from both deciduous and coniferous trees can be used. Blends of hardwood kraft pulps, especially eucalyptus, and northern softwood kraft (NSK) pulps are particularly suitable for making the tissue webs of the present invention. Another preferred embodiment of the present invention comprises layered fibrous structures wherein, most preferably, hardwood pulps such as eucalyptus are used for outer layer(s) and wherein northern softwood kraft pulps are used for the inner layer(s). In addition, blends of softwood kraft pulps such as northern softwood kraft (NSK) and softwood or hardwood (CTMP). A preferred CTMP pulp is supplied by Quesnel River Pulp Co. of Quesnel, British Columbia. Also applicable to the present invention are fibers derived from recycled paper, which may contain any or all of the above categories of fibers.

Additives such as particulate fillers, including clay, calcium carbonate, titanium dioxide, talc, aluminum silicate, calcium silicate, alumina trihydrate, activated carbon, pearl starch, calcium sulfate, glass microspheres, diatomaceous earth, and mixtures thereof can also be included in the aqueous papermaking furnish.

Other additives, of which the following are examples, can be added to the aqueous papermaking furnish or the fibrous structure to impart other characteristics to the paper product or improve the papermaking process so long as they do not interfere or counteract the advantages of the present invention.

It is sometimes useful, for purposes of retention and fibrous structure strength to include starch as one of the ingredients of the papermaking furnish, especially cationic starch. Particularly suitable starches for this purpose are produced by National Starch and Chemical Company, (Bridgewater, N.J.) under the tradename, REDIBOND®.

It is common to add a cationic charge biasing species to the papermaking process to control the zeta potential of the aqueous papermaking furnish as it is delivered to the papermaking process. One suitable material is CYPRO 514®, a product of Cytec, Inc. of Stamford, Conn.

It is also common to add retention aids. Multivalent ions can be effectively added to the aqueous papermaking furnish in order to enhance the retention of fine particles which might otherwise remain suspended in the recirculating water system of the paper machine. The practice of adding alum, for example, has long been known. More recently, polymers which carry many charge sites along the chain length have been effectively employed for this purpose. Both anionic and cationic flocculants are expressly included within the scope of the present invention. Flocculants such as RETEN 235®, a product of Hercules, Inc. of Wilmington, Del. and ACCU-RAC 171®, a product of Cytec, Inc. of Stamford, Conn. are examples of anionic flocculants. Flocculants such as RETEN 157®, a product of Hercules, Inc. of Wilmington, Del. and ACCURAC 91®, a product of Cytec, Inc. of Stamford, Conn. are examples of acceptable cationic flocculants.

The use of high surface area, high anionic charge microparticles for the purposes of improving formation, drainage, strength, and retention is well known in the art. See, for example, U.S. Pat. No. 5,221,435, issued to Smith on Jun. 22, 1993, incorporated herein by reference. Common materials for this purpose are silica colloid, bentonite clay, or organic microparticles. The incorporation of such materials is expressly included within the scope of the present invention.

Additionally, it is common to add fugitive wet strength resins to paper products, such as toilet tissue, which must have limited strength when wet because of the need to dispose of them through toilets into septic or sewer systems. Fugitive wet strength resins refer to wet strength resins which impart a wet strength characterized by the decay of part or all of the resin's wet strength potency upon standing in the presence of water. If fugitive wet strength is desired, binder materials such as dialdehyde starch or other resins with aldehyde functionality may be used. Example of suitable fugitive wet strength resins include CO-BOND 1000 commercially available from National Starch and Chemical Company, of Portland, Me., PAREZ 750 commercially available from CyTec of Stamford, Conn. and the resin described in U.S. Pat. No. 4,981,557, issued to Bjorkquist on Jan. 1, 1991 and incorporated herein by reference.

If enhanced absorbency is needed, surfactants may be used to treat the creped tissue paper webs of the present invention. The preferred surfactants have alkyl chains with eight or more carbon atoms. Exemplary anionic surfactants are linear alkyl sulfonates, and alkylbenzene sulfonates. Exemplary nonionic surfactants are alkylglycosides including alkylglycoside esters such as CRODESTA SL-40 which is available from Croda, Inc. (New York, N.Y.); alkylglycoside ethers as described in U.S. Pat. No. 4,011,389, issued to W. K. Langdon et al. on Mar. 8, 1977; and alkylpolyethoxylated esters such as PEGOSPERSE 200ML available from Glyco Chemicals, Inc. in Greenwich, Conn.; alkylpolyethoxylated ethers such as Neodol 45-7 available from Exxon and IGEPAL RC-520 available from Rhone Poulenc Corporation in Cranbury, N.J.

Chemical softening agents are expressly included as optional ingredients. Acceptable chemical softening agents comprise the well known dialkyldimethylammonium methyl sulfate, di(hydrogenated) tallow dimethyl ammonium chloride; with di(hydrogenated) tallow dimethyl ammonium methyl sulfate being preferred. This particular material is available commercially from Witco Chemical Company Inc. of Dublin, Ohio under the trade name of VARISOFT 137. Biodegradable mono and di-ester variations of the quaternary ammonium compound can also be used and are within the scope of the present invention.

The above listings of chemical additives are intended to be merely exemplary in nature, and are not meant to limit the scope of the invention.

Preparation of the Fibrous Structure

The fibrous structure of this invention may be made according to commonly assigned U.S. Pat. No. 3,301,746 issued to Sanford et al. on Jan. 31, 1967; U.S. Pat. No. 3,926,716 issued to Bates on Dec. 16, 1975; U.S. Pat. No. 4,191,609 issued to Trokhan on Mar. 4, 1980; U.S. Pat. No. 4,300,981 issued to Carstens on Nov. 17, 1981; U.S. Pat. No. 4,191,609 issued to Trokhan on Mar. 4, 1980; U.S. Pat. No. 4,514,345 issued to Johnson et al. on Apr. 30, 1985; U.S. Pat. No. 4,528,239 issued to Trokhan on Jul. 9, 1985; U.S. Pat. No. 4,529,480 issued to Trokhan on Jul. 16, 1985; U.S. Pat. No. 4,637,859 issued to Trokhan on Jan. 20, 1987; U.S. Pat. No. 5,245,025 issued to Trokhan et al. on Sep. 14, 1993; U.S. Pat. No. 5,274,930 issued to Ensign et al. on Jan. 4, 1994; U.S. Pat. No. 5,275,700 issued to Trokhan on Jan. 4, 1994; U.S. Pat. No. 5,328,565 issued to Rasch et al. on Jul. 12, 1994; U.S. Pat. No. 5,332,118 issued to Muckenfuhs on Jul. 26, 1994; U.S. Pat. No. 5,334,289 issued to Trokhan et al. on Aug. 2, 1994; U.S. Pat. No. 5,364,504 issued to Smurkowski et al. on Nov. 15, 1995; U.S. Pat. No. 5,527,428 issued to Trokhan et al. on Jun. 18, 1996; U.S. Pat. No. 5,529,664, issued to Trokhan et al. on Jun. 25, 1996; U.S. Pat. No. 5,556,509 issued to Trokhan et al. on Sep. 17, 1996; U.S. Pat. No. 5,628,876 issued to Ayers et al. on May 13, 1997; U.S. Pat. No. 5,629,052 issued to Trokhan et al. on May 13, 1997; and U.S. Pat. No. 5,637,194 issued to Ampulski et al. on Jun. 10, 1997, the disclosures of which are incorporated herein by reference for the purpose of showing how to make a fibrous structure suitable for use with the present invention.

The fibrous structure of the present invention may be conventionally wet pressed or preferably through-air dried. It may be foreshortened by creping or by wet microcontraction. Creping and wet microcontraction are disclosed in commonly assigned U.S. Pat. No. 4,440,597 issued to Wells et al. on Apr. 3, 1984 and U.S. Pat. No. 4,191,756 issued to Sawdai on May 4, 1980, the disclosures of which patents are incorporated herein by reference.

Figure 1:
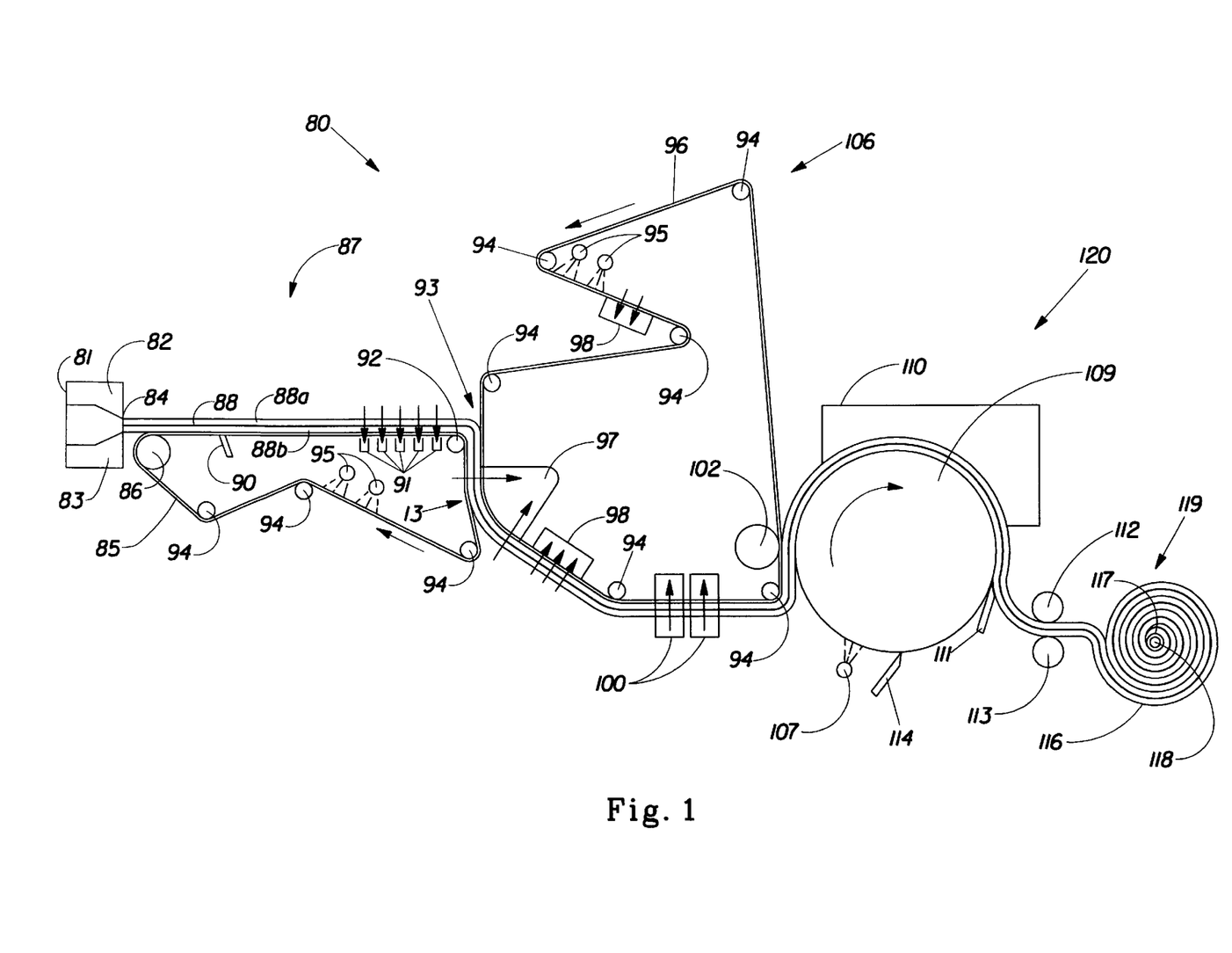
FIG. 1 is a schematic side elevational view of a preferred papermaking apparatus for use with this invention.

Referring to FIG. 1, the paper machine 80 comprises a headbox 81 and preferably a layering headbox having a top chamber 82, a bottom chamber 83, and a slice roof 84. The paper machine 80 has a forming section 87 encircled by a forming fabric 85. The forming fabric 85 is carried around the forming section 87 by the breast roll 86, a deflector 90, vacuum suction boxes 91, couch roll 92 and a plurality of turning rolls 94. Prior to making a full rotation around the forming section 87, the forming fabric 85 is cleaned by the cleaning showers 95 as it makes its return run in the direction shown by the arrow.

A web transfer zone 93 separates the forming section 87 from the pre-drying section 106 of the paper machine 80. A foraminous carrier fabric 96 encircles the pre-drying section 106. As the foraminous carrier fabric 96 loops around the pre-drying section 106, it passes over a vacuum dewatering box 98, passes through the through-air dryers 100 and continues on past a turning roll 94 and a pressure roll 102. The foraminous carrier fabric 96 is cleaned and dewatered as it completes its loop by passing over and around additional turning rolls 94, cleaning showers 95 and another vacuum dewatering box 98.

Providing a Drying Surface

The drying section 120 is next in the papermaking apparatus after the pre-drying section 106. The drying section 120 is comprised of a drying surface. The drying surface may be at ambient temperature or it may be heated. Any drying surface is suitable, however, a Yankee dryer 109 is preferable. The Yankee dryer 109 is generally steam heated. A drying hood 110 which circulates hot air by a means not shown may be positioned over the Yankee dryer 109 in an effort to further facilitate the drying operation. In the preferred embodiment, at least one creping aid spray boom shower 107 is juxtaposed with the Yankee dryer 109. A creping blade 111 is positioned against the surface of the Yankee dryer 109 so as to create an impact angle between the blade and the surface of the dryer wherein the impact angle ranges from about 70° to 90° and preferably from about 80° to 85°. An optional cleaning blade 114 may be utilized to remove contaminant buildup and excess coating from the surface of the Yankee dryer 109.

Applying a Creping Aid

The creping aid of this invention may be applied directly to the fibrous structure 88. Preferably the creping aid is applied to the surface of the fibrous structure 88 which directly contacts the drying surface. The creping aid may also be applied in the forming section 87 of the paper machine 80 such as to the forming fabric 85. Preferably, the creping aid is applied to the surface of the forming fabric 85 which directly contacts the fibrous structure 88. The creping aid may also be applied in the pre-drying section 106 to the foraminous carrier fabric 96. Preferably the creping aid is applied to the surface of the foraminous carrier fabric 96 which directly contacts the fibrous structure 88. Most preferably, the creping aid is applied directly to the drying surface such as to the surface of the Yankee dryer 109.

The creping aid of this invention comprises a film-forming semi-crystalline polymer and a non-thermosetting cationic resin which may be formulated with secondary or tertiary amines in the prepolymer backbone. Suitable film-forming semi-crystalline polymers include hemicellulose, carboxymethyl cellulose and preferably polyvinyl alcohol. Polyvinyl alcohols having a degree of hydrolysis of about 86% or more are preferred. A suitable polyvinyl alcohol is AIRVOL 425 commercially available from Air Products and Chemical Inc. of Allentown, Pa.

Figure 2:
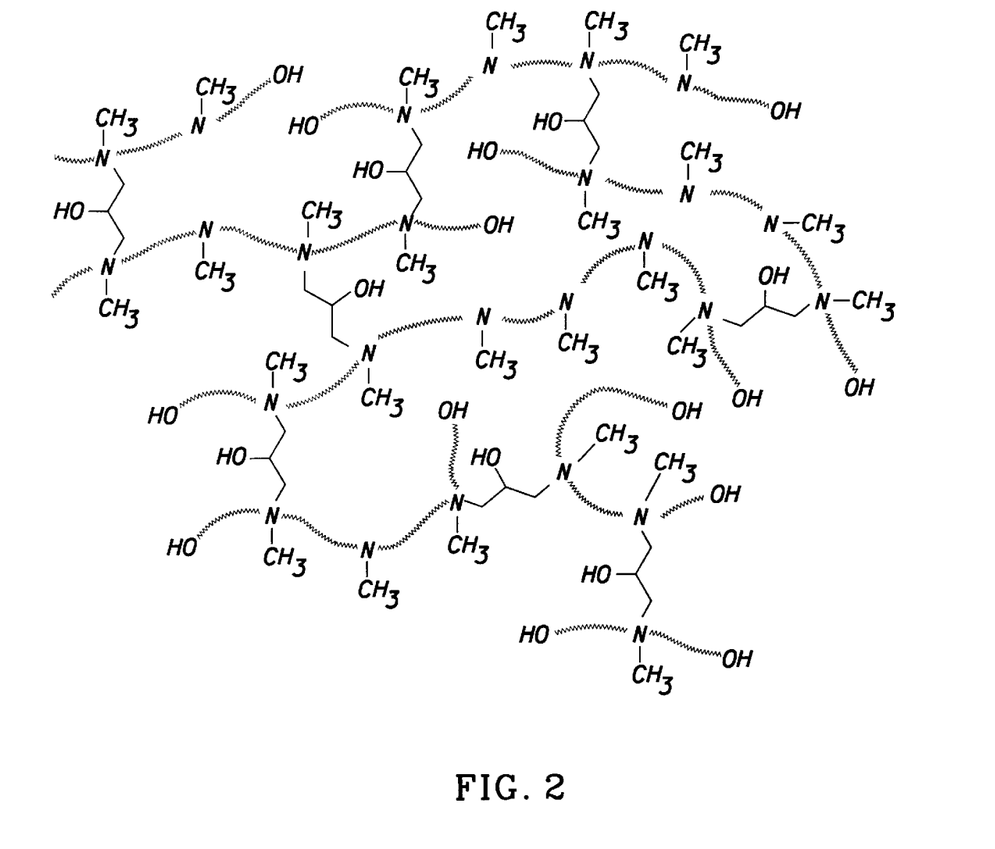
FIG. 2 is an illustration of the chemical structure of the prophetically preferred resin for use with this invention.

Referring to FIG. 2, the non-thermosetting cationic resin of this invention has a prepolymer backbone comprised of intralinked polyamidoamine. The intralinked polyamidoamine may be formulated with secondary or preferably tertiary amines in the prepolymer backbone. For those papermaking processes utilizing thermosetting wet strength resins, it is prophetically preferred that the backbone structure of the non-thermosetting cationic resin of this invention be derived from a polyalkylene polyamine having at least two primary amine groups and at least one tertiary amine and no secondary amines. A suitable polyalkylene polyamine is N-methyl-bis-(aminopropyl)amine (MBAPA). For papermaking applications which do no utilize thermosetting wet strength resins or for those papermaking applications which utilize only temporary wet strength resin technology, the prepolymer backbone can be chosen from any of the suggested prepolymer options.

The intralinked polyamidoamine is preferably characterized by a highly branched structure that lacks the reactive intralinker functionality of prior art wet strength resins and creping adhesive resins. This highly branched structure results from reacting a prepolymer of controlled molecular weight, especially a prepolymer of predetermined low molecular weight, with the requisite amount of epichlorohydrin or other intralinking agent.

Further, the intralinked polyamidoamine of the present invention is preferably a non-thermosetting and endcapped intralinked polyamidoamine. Also as a matter of preference, the intralinked polyamidoamine of the invention is free or substantially free of reactive intralinker functionality.

The intralinked polyamidoamine of the invention preferably comprises the reaction product of reactants which include at least one dicarboxylic acid or dicarboxylic acid derivative, at least one polyamine, at least one endcapping agent, and at least one intralinker. An endcapping agent as used herein, refers to an agent that attaches to or reacts with the dicarboxylic acid, dicarboxylic acid derivative or polyamine or attaches to or reacts with dicarboxylic acid or polyamine residues thereby preventing the further reaction of these reactants and residues. The endcapping agent preferably comprises at least one member selected from the group consisting of monofunctional amines, monofunctional carboxylic acids, and monofunctional carboxylic acid esters.

Further, the intralinked polyamidoamine of the invention preferably comprises the reaction product of an endcapped polyamidoamine prepolymer and the at least one intralinker. The endcapped polyamidoamine prepolymer itself preferably comprises the reaction product of the at least one dicarboxylic acid or dicarboxylic acid derivative, the at least one polyamine, and the at least one endcapping agent.

Also as a matter of preference, the endcapped polyamidoamine prepolymer is free or substantially free of amine and carboxyl end groups. Additionally, the endcapped polyamidoamine prepolymer preferably comprises alternating dicarboxylic acid and polyamine residues, and endcaps lacking carboxyl and amine functionality. Yet further, the endcaps are preferably amide endcaps.

The endcapped polyamidoamine prepolymer preferably has a $DP_n$ of about 2 to about 50, more preferably about 3 to about 25, and still more preferably about 3 to about 10 wherein $DP_n$ refers to the degree of polymerization of the monomer units. Also as a matter of preference, the mole ratio of the intralinker to intralinker reactive amine groups in the endcapped polyamidoamine prepolymer is between about ½ [1/(DP$_n$-1)] and about 1/(DP$_n$-1).

Upon continued exposure to a thermosetting resin containing azetidinium active functional groups in conjunction with the high temperature conditions found on the Yankee dryer 109 of FIG. 1, a non-thermosetting resin having secondary amine groups in the backbone structure would be expected to continue crosslinking, resulting in its brittleness and a loss of its adhesive properties. This is not the case however with the prophetically preferred resin of this invention. The critical aspect of the prophetically preferred non-thermosetting resin of this invention is the absence of thermosetting properties due to the absence of an active crosslinking functional group and the absence of secondary amine groups. Due to the absence of active intralinker, the prophetically preferred non-thermosetting resin of this invention will not react with other resins containing secondary amine groups. Additionally, due to the absence of secondary amine groups, the prophetically preferred non-thermosetting resin of this invention tends not to react with the active intralinker such as azetidinium commonly found in thermosetting resins. Thus, when used in the presence of those wet strength resins having active secondary amine groups, such as those wet strength resins which contain azetidinium active functional groups (e.g.; KYMENE), the non-thermosetting cationic resin of the prophetically preferred resin of this invention will not crosslink with the azetidinium active functional groups of the wet strength resins. Hence, as the non-thermosetting cationic resin of this invention will not crosslink with the azetidinium active functional groups of the wet strength resins, there is no loss of adhesion associated with the use of this resin. Furthermore, included within the scope of this invention are films prepared from the non-thermosetting cationic resin of this invention that can be completely redissolved in distilled water within 24 hours. Thus the resin of this invention tends to improve the overall rewettability of the coating formed on the surface of the Yankee dryer 109 when compared to prior art resins.

Preparation of the prophetically preferred non-thermosetting cationic resin of this invention reported in EP 0,802,215 and published on Oct. 22, 1997 is incorporated herein by reference. The prophetically preferred resin prepolymer is prepared by mixing a diacid such as adipic acid, a polyamine such as N-methyl bis (3-aminopropylamine), and an endcapping agent such as monoethanolamine. A mixture of these three reactants is heated at a temperature of about 160° C. to 170° C. for about ½ hour to 4 hours, at atmospheric pressure. Where a reduced pressure is employed, lower temperatures may be utilized. This polycondensation reaction produces water as a byproduct, which is removed by distillation. At the end of this reaction the resulting product is dissolved in water at a concentration of about 50% by weight of total polymer solids.

Where diester is used instead of diacid, the prepolymerization can be conducted at a lower temperature, specifically about 110° C. at atmospheric pressure. In this case the byproduct will be an alcohol, the type of alcohol byproduct formed depends upon the identity of the diester. For instance, where a dimethyl ester is employed the alcohol byproduct will be methanol, while ethanol will be the byproduct obtained from a diethyl ester.

An aqueous solution of the prepolymer is reacted with intralinker to obtain the intralinked polyamidoamine. The prepolymer and intralinker are mixed with an appropriate amount of dilution water, to provide a reaction solution having a concentration of about 30% by weight of total solids (prepolymer+intralinker). This mixture is then maintained at a temperature of about 25° C. to 80° C., more preferably about 50° C. to 70° C. and most preferably about 60° C.

The viscosity of the mixture is monitored, using Gardner-Holdt viscosity tubes. The reaction is continued until viscosity reaches a particular value, preferably on the Gardner-Holdt scale, at which point cold dilution water is added to end the reaction. Alternatively, the reaction may be diluted with warm water, with the heating being continued until the viscosity again builds to the "L" level. Several such iterations can be performed before the reaction is ended.

Synthesis of the Prepolymers

Referring to Table I, Example 1 is a polyamidoamine prepared from adipic acid and diethylenetriamine, without the endcapping agent of the present invention. This prepolymer is included for the purpose of comparison with the prepolymers of the invention.

For the prepolymers of Examples 2 and 3, which are prepolymers of the invention, the polyamine and the monoethanolamine endcapping agent were added to a 2,000 ml. resin kettle fitted with a condenser, Dean-Stark trap, thermocouple, addition funnel, and mechanical stirrer. Stirring of this mixture was then initiated, and the adipic acid was cautiously added during the stirring. The temperature of the reaction mixture was maintained below 125° C. by controlling the rate at which the adipic acid was added.

After the addition of the adipic acid was completed, the temperature was raised to 169° C. to 171° C. and maintained in this range for 4 hours. During this period, water of distillation was removed through the Dean-Stark trap. Hot water (70° C.) was cautiously added to the product, which was stirred until the prepolymer was dissolved.

Table 1 below sets forth the amount of reactants employed in preparing the prepolymers of Examples 1–3, as well as the actual and theoretical water of distillation, the amount of hot water added during the synthesis, and the solids content of the product. Table 1 also lists theoretical and actual molecular weight values (provided as DP$_n$ and RSV, respectively) for the resulting prepolymers.

TABLE I

SYNTHESIS OF PREPOLYMERS

| Example No. | Theoretical DP$_n$ | Moles Adipic | Moles Polyamine | Moles MEA | RSV (dL/g)[1] | Theo. W. Of Dist. | Actual W. Of Dist. | Added Hot Water | Solids |
|---|---|---|---|---|---|---|---|---|---|
| 1 | 100 | 3.00 | 3.00 DETA | 0.00 | 0.1436 | 108 mL | 97 mL | 676 mL | 50.0% |

TABLE I-continued

SYNTHESIS OF PREPOLYMERS

| Example No. | Theo-retical $DP_n$ | Moles Adipic | Moles Poly-amine | Moles MEA | RSV $(dL/g)^1$ | Theo. W. Of Dist. | Actual W. Of Dist. | Added Hot Water | Solids |
|---|---|---|---|---|---|---|---|---|---|
| 2 | 6.80 | 2.00 | 1.77 MBAPA | 0.46 | 0.0914 | 72 mL | 63 mL | 500 mL | 51.9% |
| 3 | 3.67 | 2.00 | 1.50 MBAPA | 1.00 | 0.0698 | 72 ml | 61 mL | 500 mL | 51.6% |

$^1$Measured at 25° C. in 1.0 M $NH_4Cl$ at a concentration of 2.00 g/dL

Synthesis of the Resins

Referring to Table II, the prepolymers of Examples 2 and 3 in Table I were used to prepare resin Samples A and B, respectively.

Prepolymer, intralinker, and water were added to a 500 ml 4-necked flask fitted with a condenser, addition funnel, thermocouple, and mechanical stirrer. The temperature of the mixture was raised to 60° C. Viscosity was monitored using Gardner-Holdt tubes while the temperature was held at this point.

For resin samples A and B, the reaction was conducted as a single step. Specifically, cold dilution water was added to cool the reaction to room temperature when the terminal viscosity was reached. At the point of terminal viscosity the reaction was diluted with cold water, and cooled to room temperature. A light gold product was thusly provided.

Table II below sets forth the amounts of prepolymer (g/g solids/eq) and intralinker (g/moles) employed in preparing the intralinked polyamidoamines of resin samples A and B. Table II also sets forth the solids content, pH and Brookfield viscosity (in centipoises) of the resin, as well as the above-noted Gardner-Holdt reaction points and reduced specific viscosity of the resin.

Further in Table II, the Max. % intralinker value also denotes the amount of intralinker used in the foregoing Samples. Yet additionally, it is the maximum amount of the intralinker which can be reacted with the indicated prepolymer, without causing the resin to gel or resulting in a resin with reactive intralinker functionality. This measurement is accordingly provided as a mole percent of the intralinker, based on the intralinker reactive amine groups in the prepolymer—i.e., it is calculated as the molar percent of the indicated intralinker reactive amine functionality. The resulting value thusly expresses as a percentage, the relationship of moles of intralinker per mole of intralinker reactive amine groups in the prepolymer.

TABLE II

SYNTHESIS OF RESINS

| Resin Sample | Pre-pol Ex. # | Charge Pre-polymer g/g solids/$eq^a$ | Intra-linker; g/moles$^b$ | Max. % Intra-linker | Water (mL) | Time; (min.)$^c$ | Resin Gardner-Holt Viscosity | Added Water (mL) | B.V. (cPs) | Resin RSV $(dL/g)^{4d}$ | pH | Solids |
|---|---|---|---|---|---|---|---|---|---|---|---|---|
| A | 2 | 117.89/ 61.18/ 0.20 | 4.63/ 0.050 Epi | 25.0% Epi | 100 | 102 | L | 150 | 43.1 | 0.3677 | 9.87 | 17.2% |
| B | 3 | 138.31/ 71.37/ 0.20 | 7.78/ 0.084 Epi | 42.0% Epi | 115 | 470 | C | 150 | 16.6 | 0.1486 | 9.82 | 19.3% |

$^a$Grams of prepolymer solution/grams of solid prepolymer/total equivalents of intralinker reactive amine in prepolymer.
$^b$Grams intralinker/moles intralinker; epi = epichlorohydrin.
$^c$Time for reaction mixture to reach viscosity after temperature reaches 60° C.
$^d$Measured at 25° C. in 1.0 M $NH_4Cl$ at a concentration of 2.00 g/dL.

Optionally, the creping aid of this invention may also include a modifier. Modifiers are used to alter the adhesion/creping characteristics of the coating formed on the surface of the Yankee dryer 109 resultant from the application of the creping aid to the Yankee dryer 109 surface. Suitable modifiers include hydrocarbon oils, surfactants, and preferably plasticizers.

Surfactants and hydrocarbon oils function primarily by increasing the lubricity of the coating formed on the drying surface thereby modifying the release characteristics of the coating. Surfactants and hydrocarbon oils tend to be incompatible with the other components of the creping aid. When added as a component of the creping aid, there is a tendency for the surfactant or hydrocarbon oil to separate out from the rest of the creping aid solution thereby forming a two phase creping aid solution which in turn decreases the overall efficacy of the creping aid.

Furthermore, this incompatibility will also negatively impact the quality of the coating formed on the drying surface. While not wishing to be constrained by theory, it is believed that both surfactants and oils will form an oil film at the interface of the coating and the fibrous structure 88 resulting in a loss of adhesion of the fibrous structure 88 to the surface of the Yankee dryer 109.

Conversely, a plasticizer tends to be fully compatible with the creping aid. The plasticizer useable with this invention, which forms a stable dispersion in water, is compatible with the other components of the creping aid of this invention. The plasticizer functions by reacting with the other components of the creping aid so as to soften the coating formed on the surface of the Yankee dryer 109. Suitable plasticizers include propylene glycol, diethylene glycol, triethylene glycol dipropylene glycol, glycerol, and preferably ethylene glycol. A prophetically preferred plasticizer, sold commercially as CREPETROL R 6390, is available from Hercules Incorporated of Wilmington, Del.

The creping aid of this invention may be printed, blown, puddled or preferably sprayed onto the surface of the Yankee dryer 109 through the creping aid spray boom shower 107. The film-forming semi-crystalline polymer, the non-thermosetting cationic resin and the optional plasticizer may all be applied together to the surface of the Yankee dryer 109 or they may each be applied separately. Additionally, the non-thermosetting cationic resin and the plasticizer may be applied together while the polyvinyl alcohol is applied separately.

The non-thermosetting cationic resin of this invention has a total solids content range of about 1% to 60% based on the dry weight of the resin. For application as a creping adhesive, a total solids content range of about 1% to 40% by weight of resin is preferred, concentrations of about 5% to 35% are more preferred and concentrations of about 10% to 30% are most preferred. The non-thermosetting cationic resin comprises from about 5% to 90% of the creping aid based on the dry weight of the resin relative to the dry weight of the creping aid. The polyvinyl alcohol of this invention comprises from about 5% to 90% of the creping aid based on the dry weight of the polyvinyl alcohol relative to the dry weight of the creping aid. The optional plasticizer of this invention comprises from about 0.5% to 90% of the creping aid based on the dry weight of the plasticizer relative to the dry weight of the creping aid. The application rate of the creping aid is about 0.25 to 8.5 pounds of dry weight of the total applied creping aid per ton of dry fiber produced at the reel 119 of the paper machine 80.

In the preferred operation, a first aqueous papermaking furnish is pumped through a top chamber 82 and a second aqueous papermaking furnish is pumped through the bottom chamber 83. Each furnish is pumped out of the slice roof 84 onto the forming fabric 85 wherein the two furnishes combine to form a fibrous structure 88 comprising a first layer 88a and a second layer 88b. The fibrous structure 88 is dewatered on the forming fabric 85 assisted by the deflector 90 and vacuum suction boxes 91.

The fibrous structure 88 is then transferred to the pre-drying section 106. As the fibrous structure 88 enters the web transfer zone 93, it is transferred to the foraminous carrier fabric 96 by the action of the vacuum transfer box 97. The foraminous carrier fabric 96 carries the fibrous structure 88 from the transfer zone past the vacuum dewatering box 98 through the through-air dryers 100 and past a turning roll 94.

Applying the Fibrous Structure to the Drying Surface

The fibrous structure 88 is transferred from the foraminous carrier fabric 96 to the Yankee dryer 109 surface. At this point of transfer, the fibrous structure 88 has a consistency of about 10% to 90%, preferably 45% to 75%, and more preferably 55% to 65%. The fibrous structure 88 is secured to the surface of the Yankee dryer 109 by the pressure roll 102 assisted by the creping aid. The fibrous structure 88 is dried by the steam heated Yankee dryer 109 and by hot air which is circulated through a drying hood 110.

Removing the Fibrous Structure from the Drying Surface

The fibrous structure 88 is removed from the surface of the Yankee dryer 109 preferably by creping it from the surface with a creping blade 111. The fibrous structure 88 then passes between calendar rolls 112 and 113 and is wound into a roll 116 on a core 117 disposed on a shaft 118.

The present invention is applicable to creped tissue paper in general and includes but is not limited to conventionally wet pressed creped tissue paper, high bulk pattern densified creped tissue paper and high bulk, uncompacted creped tissue paper.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method for producing paper products, said method comprising the steps of:

a) providing a fibrous structure;

b) providing a drying surface;

c) applying a creping aid whereby said creping aid contacts one of said drying surface and said fibrous structure, said creping aid comprising a film-forming semi-crystalline polymer and a non-thermosetting cationic resin wherein said non-thermosetting cationic resin is characterized by a highly branched structure that lacks reactive intralinker functionality and which has a prepolymer backbone comprised of endcapped polyamidoamine wherein said endcapped polyamidoamine prepolymer comprises the reaction product of at least one dicarboxylic acid or dicarboxylic acid derivative, at least one polyamine, and at least one endcapping agent wherein said endcapping agent comprises at least one member selected from the group consisting of monofunctional amines, monofunctional carboxylic acids, and monofunctional carboxylic acid esters and wherein said endcapped polyamidoamine prepolymer is free or substantially free of amine and carboxyl end groups;

d) drying said fibrous structure on said drying surface; and e) removing said fibrous structure from said drying surface.

2. The method of claim 1 wherein said step of applying said creping aid comprises applying said creping aid directly to said drying surface.

3. The method of claim 1 wherein said fibrous structure has a first surface and a second surface wherein said second surface contacts said drying surface, and wherein said creping aid is applied directly to said second surface of said fibrous structure.

4. The method of claim 1 wherein said step of applying said creping aid comprises applying said creping aid directly to a forming fabric.

5. The method of claim 1 wherein said step of applying said creping aid comprises applying said creping aid directly to a foraminous carrier fabric.

6. The method of claim 1 wherein said drying surface is heated.

7. The method of claim 1 wherein said step of removing said fibrous structure from said drying surface is accomplished by creping.

8. The method of claim 1 wherein said creping aid is applied at a rate of from about 0.25 to 8.5 pounds of dry weight of the total applied creping aid per ton of dry fiber produced at a reel of a paper machine.

9. The method of claim 1 wherein said creping aid further comprises a plasticizer.

10. The method of claim 9 wherein said plasticizer is selected from the group consisting of ethylene glycol, propylene glycol, diethylene glycol, triethylene glycol, dipropylene glycol and glycerol.

11. The method of claim 1 wherein said fibrous structure has a moisture content of between about 10% to about 90% upon contact with said drying surface.

* * * * *